(12) United States Patent
Lee et al.

(10) Patent No.: US 8,086,930 B2
(45) Date of Patent: Dec. 27, 2011

(54) FIXED-SPACING PARITY INSERTION FOR FEC (FORWARD ERROR CORRECTION) CODEWORDS

(75) Inventors: Tak K. Lee, Irvine, CA (US); Ba-Zhong Shen, Irvine, CA (US); Hau Thien Tran, Irvine, CA (US); Kelly Brian Cameron, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1001 days.

(21) Appl. No.: 12/021,911

(22) Filed: Jan. 29, 2008

(65) Prior Publication Data

US 2009/0193312 A1 Jul. 30, 2009

(51) Int. Cl.
*H03M 13/11* (2006.01)
(52) U.S. Cl. ...................................................... 714/752
(58) Field of Classification Search ................... 714/752
See application file for complete search history.

(56) References Cited

U.S. PATENT DOCUMENTS

| | | | |
|---|---|---|---|
| 6,199,190 B1 * | 3/2001 | Wan | 714/786 |
| 6,567,938 B2 * | 5/2003 | Wan | 714/701 |
| 7,409,622 B1 * | 8/2008 | Lu et al. | 714/755 |
| 7,434,138 B2 * | 10/2008 | Lin et al. | 714/755 |
| 7,484,168 B2 * | 1/2009 | Siegel et al. | 714/801 |
| 2005/0053168 A1 * | 3/2005 | Song et al. | 375/261 |

* cited by examiner

*Primary Examiner* — Stephen Baker
(74) *Attorney, Agent, or Firm* — Garlick Harrison & Markison; Shayne X. Short

(57) ABSTRACT

Fixed-spacing parity insertion for FEC (Forward Error Correction) codewords. Fixed spacing is employed to intersperse parity bits among information bits when generating a codeword. According to this fixed spacing, a same number of information bits is placed between each of the parity bits within the codeword. If desired, the order of the parity bits may be changed before they are placed into the codeword. Moreover, the order of the information bits may also be modified before they are placed into the codeword. The FEC encoding employed to generate the parity bits from the information bits can be any of a variety of codes include Reed-Solomon (RS) code, LDPC (Low Density Parity Check) code, turbo code, turbo trellis coded modulation (TTCM), or some other code providing FEC capabilities.

20 Claims, 13 Drawing Sheets

FIXED-SPACING PARITY INSERTION FOR FEC (FORWARD ERROR CORRECTION) CODEWORDS

BACKGROUND OF THE INVENTION

1. Technical Field of the Invention

The invention relates generally to communication systems; and, more particularly, it relates to encoding and/or decoding of signals within such communication systems.

2. Description of Related Art

Data communication systems have been under continual development for many years. One such type of communication system that has been of significant interest lately is a communication system that employs one or more types of iterative error correction codes that oftentimes employ some form of FEC (Forward Error Correction) coding. Communications systems with iterative codes/FEC are often able to achieve lower bit error rates (BER), clock error rates (BLER), or some other measure of error rate than alternative means for a given signal to noise ratio (SNR).

A continual and primary directive in this area of development has been to try continually to lower the SNR required to achieve a given BER within a communication system. The ideal goal has been to try to reach Shannon's limit in a communication channel. Shannon's limit may be viewed as being the data rate to be used in a communication channel, having a particular SNR, that achieves error free transmission through the communication channel. In other words, the Shannon limit is the theoretical bound for channel capacity for a given modulation and code rate.

FEC encoding generally encodes information bits and generates parity bits (sometimes alternatively referred to as redundancy bits). In some instances, these parity bits are interspersed among the information bits when generating a codeword. A common prior art approach is to intersperse the parity bits evenly throughout the codeword using real time calculations based on the size of the number of information bits, the number of parity bits, etc. This inherently involves the need to calculate the spacing of the parity bits within the to be generated codeword on a cycle to cycle basis. Also, in an attempt to perform this even distribution within a discrete system, it is typical that the spacing is non-uniform (e.g., x number of information bits reside between a first parity bit and a second parity bit, and x+n number of information bits reside between the second parity bit and a third parity bit, where x and n are integers, where each of these n may as small as 1).

FIG. 6 illustrates a prior art embodiment 600 showing even interspersing of parity bits among information bits within a codeword on a cycle by cycle basis. In this prior art embodiment 600, the information bits include K=46 bits, and the parity bits include (N−K)=P=8 parity bits of a total number of available bits on N=54.

As can be seen, the parity bits are being evenly distributed among the total number of bits. Five information bits (e.g., bits 0, 1, 2, 3, 4) are placed during a cycle 0 before placing a first parity bit (e.g., bit 46) and then six information bits (e.g., bits 5, 6, 7, 8, 9, 10) are placed after the first parity bit (e.g., bit 46).

Then, in a cycle 1, a second parity bit (e.g., bit 47) is placed initially followed by six information bits (e.g., bits 11, 12, 13, 14, 15, 16) which is then followed by a third parity bit (e.g., bit 48). As can be seen already, there is a different number of information bits placed between each of the first, second and third parity bits (e.g., 5, 6, and 6, respectively).

This also inherently includes additional complexity on an apparatus performing such distribution of parity bits among the information bits. If the data to be processed in this manner, if the data comes in at a fixed rate, then it is imperative to decide which of the data are information bits and which are parity bits on a cycle to cycle basis. Each input of such a prior art scheme must be routed to both storage for the front portion (e.g., information bit portion) and storage for the back portion (e.g., parity bit portion) for proper generation of the codeword.

Generally speaking, this prior art approach of attempting to distribute the parity bits evenly among the information bits introduces complexity in a hardware implementation, in that, the parity bits will move around to different locations among the information bits when performing such processing of signals including different numbers of information bits and different numbers of parity bits.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

A novel means is presented herein in which parity bits are interspersed among information bits, using a fixed spacing scheme, when generating a codeword. The number of information bits placed between the first, second information bits, and so on is the same based on the fixed spacing employed.

The use of a fixed spacing obviates the need for calculating the spacing to be employed for even distribution of parity bits among the information bits when generating the codeword. If desired, the order of the parity bits may be changed before they are placed into the codeword. Moreover, the order of the information bits may also be modified before they are placed into the codeword. The FEC encoding employed to generate the parity bits from the information bits can be any of a variety of codes include Reed-Solomon (RS) code, LDPC (Low Density Parity Check) code, turbo code, turbo trellis coded modulation (TTCM), or some other code providing FEC capabilities.

The interspersing of parity bits among information bits may be performed to deal with a variety of conditions. In one instance, the interspersing of parity bits among information bits is performed to ensure that there is a limit on a consecutive run of 1s or 0s. In hard disk drive (HDD) applications or other information storage devices that employ some form of magnetization of media to indicate information therein (e.g., a first state to indicate a 1 and a second state to indicate a 0), a relatively long, consecutive run of 1s or 0s can generate problems within the data.

One type of code employed to ensure there is a limit on a consecutive run of 1s or 0s within an information sequence is a Run Length Limited (RLL). RLL codes can be used to ensure that a generated codeword (especially its parity bit portion) does not violate any desired limit of a consecutive run of 1s or 0s. For example, if an HDD channel requires that there are at most R 0s in a row, then an RLL code can be employed to ensure that there are at most (R−1) 0s in a row in the information bit portion of the codeword. Then, if all of the parity bits are inserted so that there is at most one parity bit every (R−1) information bits, then there will be at most R 0s in a row of in the codeword.

Another type of FEC code that can be employed to encode a signal within a communication system and/or communication device is an LDPC (Low Density Parity Check) code. For some LDPC codes, the performance of the code suffers if burst errors occur on the parity part of the generated codeword (sometime referred to as an LDPC code block). Interspersing the parity bits among the information bits of the LDPC codeword helps ensure that the parity bits are spaced out better and thus less vulnerable to burst errors.

Figure 1:
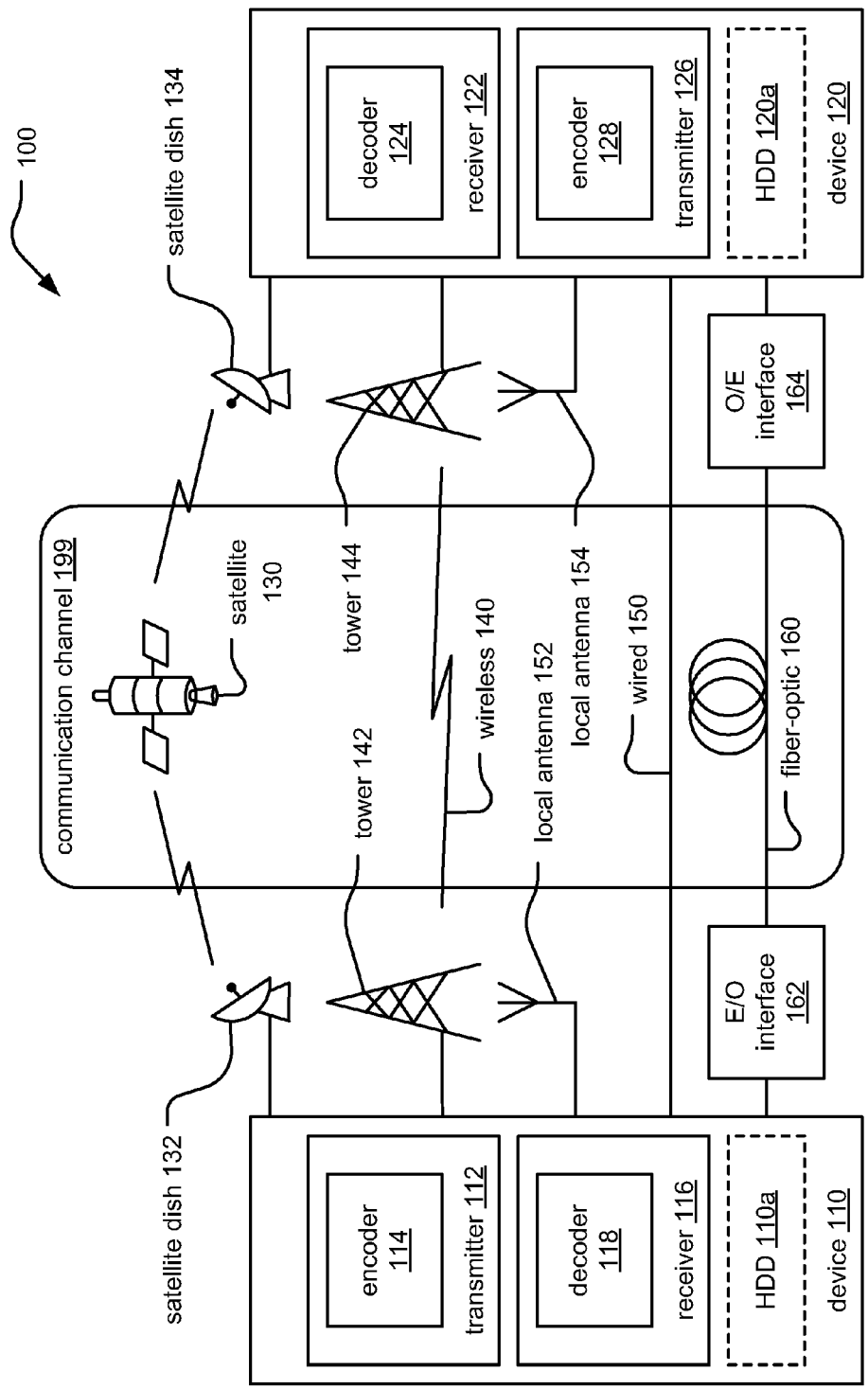
FIG. 1 illustrates an embodiment of a communication system.

The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

FIG. 1 is a diagram illustrating an embodiment of a communication system 100.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

Either one of both of the communication device 110 and the communication device 120 can include a hard disk drive (HDD) (or be coupled to a HDD). For example, the communication device 110 can include a HDD 110a, and the communication device 120 can include a HDD 120a.

The signals employed within this embodiment of a communication system 100 can be generated using any number of various FEC codes. Such a signal can be a Reed-Solomon (RS) coded signal, an LDPC (Low Density Parity Check) coded signal, a turbo coded signal, a turbo trellis coded modulation (TTCM), or a coded signal generated using some other error correction code (ECC) providing FEC capabilities.

Any of a very wide variety of applications that perform transferring of data from one location to another (e.g., including from a first location to a HDD, or from the HDD to another location) can benefit from various aspects of the invention, including any of those types of communication devices and/or communication systems depicted in FIG. 1. Moreover, other types of devices and applications that employ FEC codes (e.g., including those employing some type of HDD or other memory storage means) can also benefit from various aspects of the invention.

Figure 2:
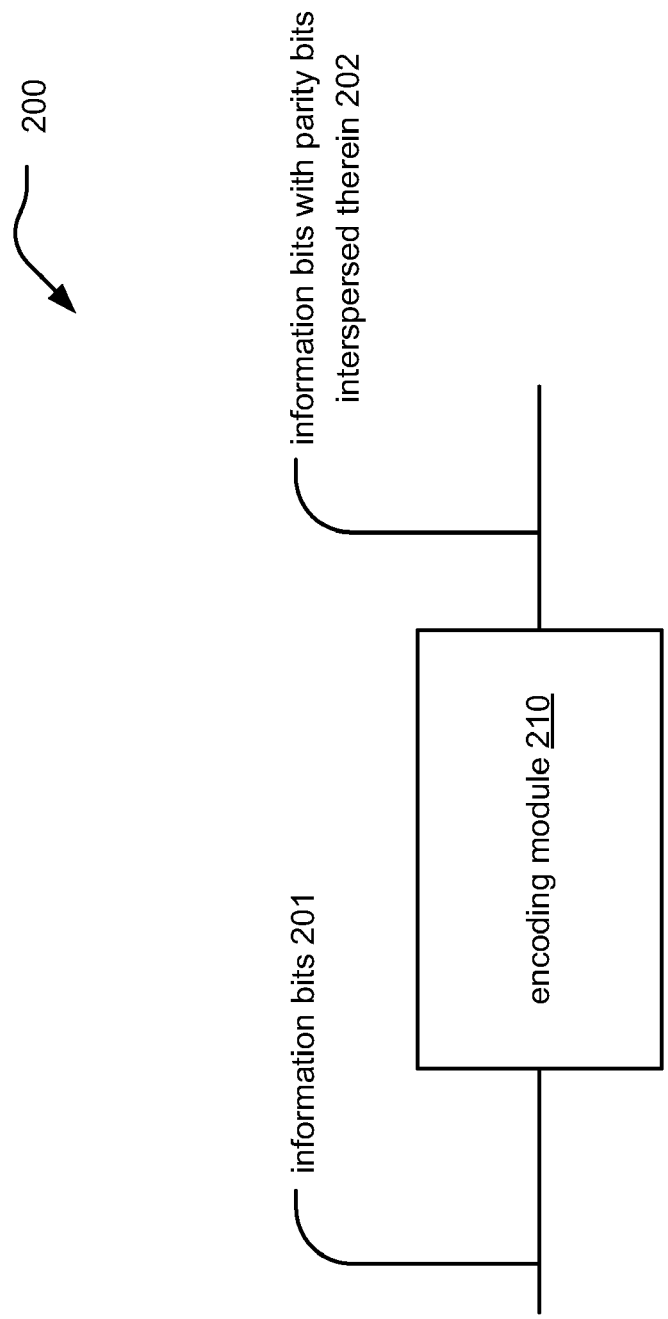
FIG. 2 illustrates an embodiment of at least one portion of a communication device.

FIG. 2 illustrates an embodiment of at least one portion of a communication device 200. Information bits 201 are provided to an encoding module 210 that is operable to perform encoding thereon to generate a signal that includes information bits with parity bits interspersed therein, as indicated by reference numeral 202.

Generally speaking, in a systematic code context, information bits undergo encoding to generate an output signal that includes the information bits followed by the parity bits. The parity bits are then interspersed among the information bits.

However, it is noted that the principles presented herein may also be extended to non-systematic codes in which parity (or redundancy bits) may also be interspersed among the coded bits generated by such a non-systematic code.

Figure 3:
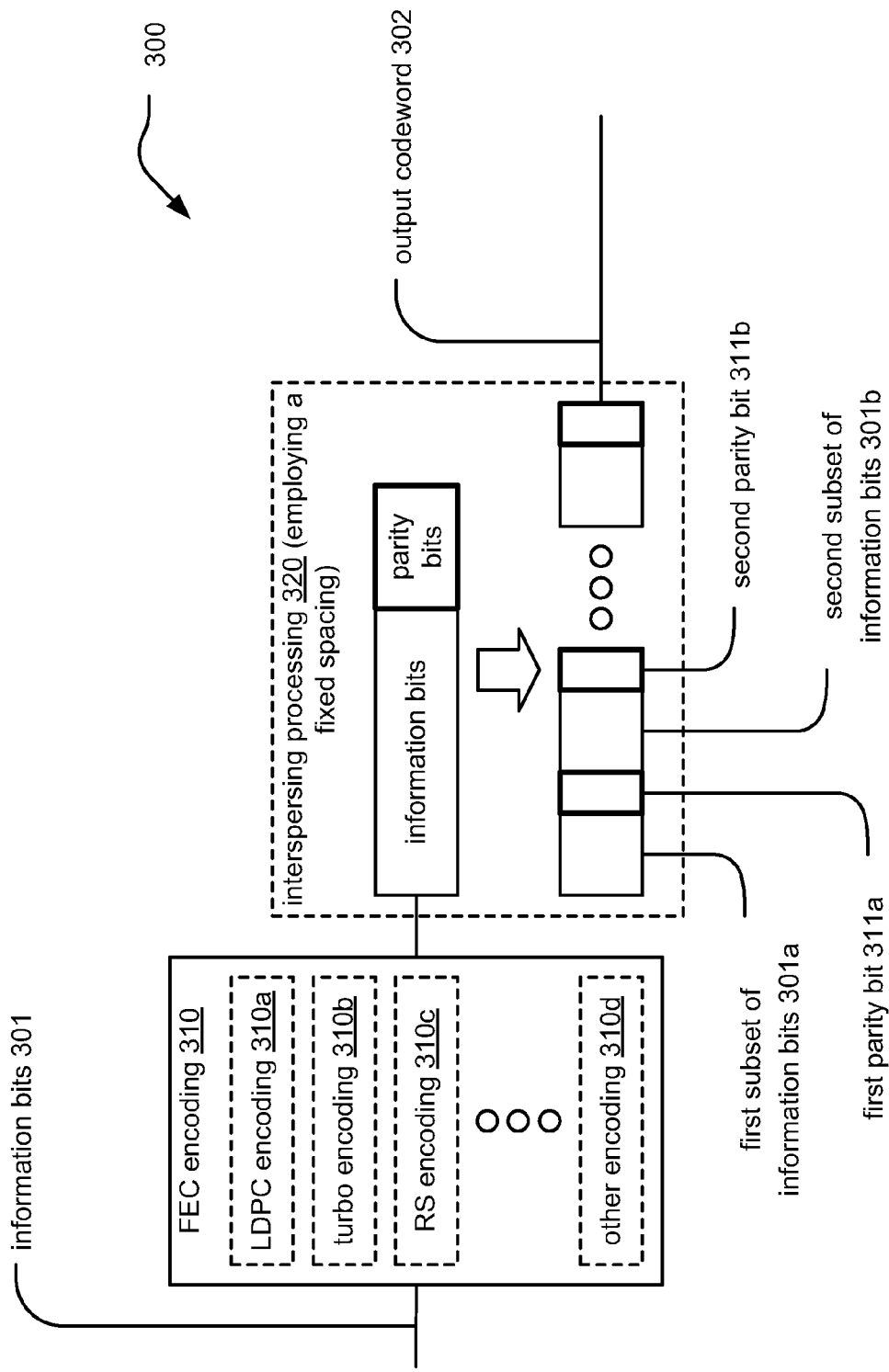
FIG. 3 illustrates an alternative embodiment of at least one portion of a communication device.

FIG. 3 illustrates an alternative embodiment of at least one portion of a communication device 300. Information bits 301 are provided to an FEC (Forward Error Correction) encoding module 310 that is operable to perform encoding thereon to generate a signal that includes the information bits 301 and parity bits. Any of a number of different types of encoding can be performed to generate the parity bits form the information bits, including LDPC encoding 310a, turbo encoding 310b, RS encoding 310c, or any other desired encoding 310d that provides some form of FEC.

Thereafter, an interspersing module 320 operates to employ a fixed spacing to intersperse the parity bits among the information bits, as shown by a first parity bit 311a being placed after a first subset of information bits 301a. Also, a second parity bit 311b is placed after a second subset of information bits 301b. An output codeword 302 is generated from these information bits with parity bits interspersed there between using a fixed spacing technique.

It is noted again that the order of one or both of the information bits and the parity bits may be changed/altered before their placement into the output codeword 402.

Figure 4:
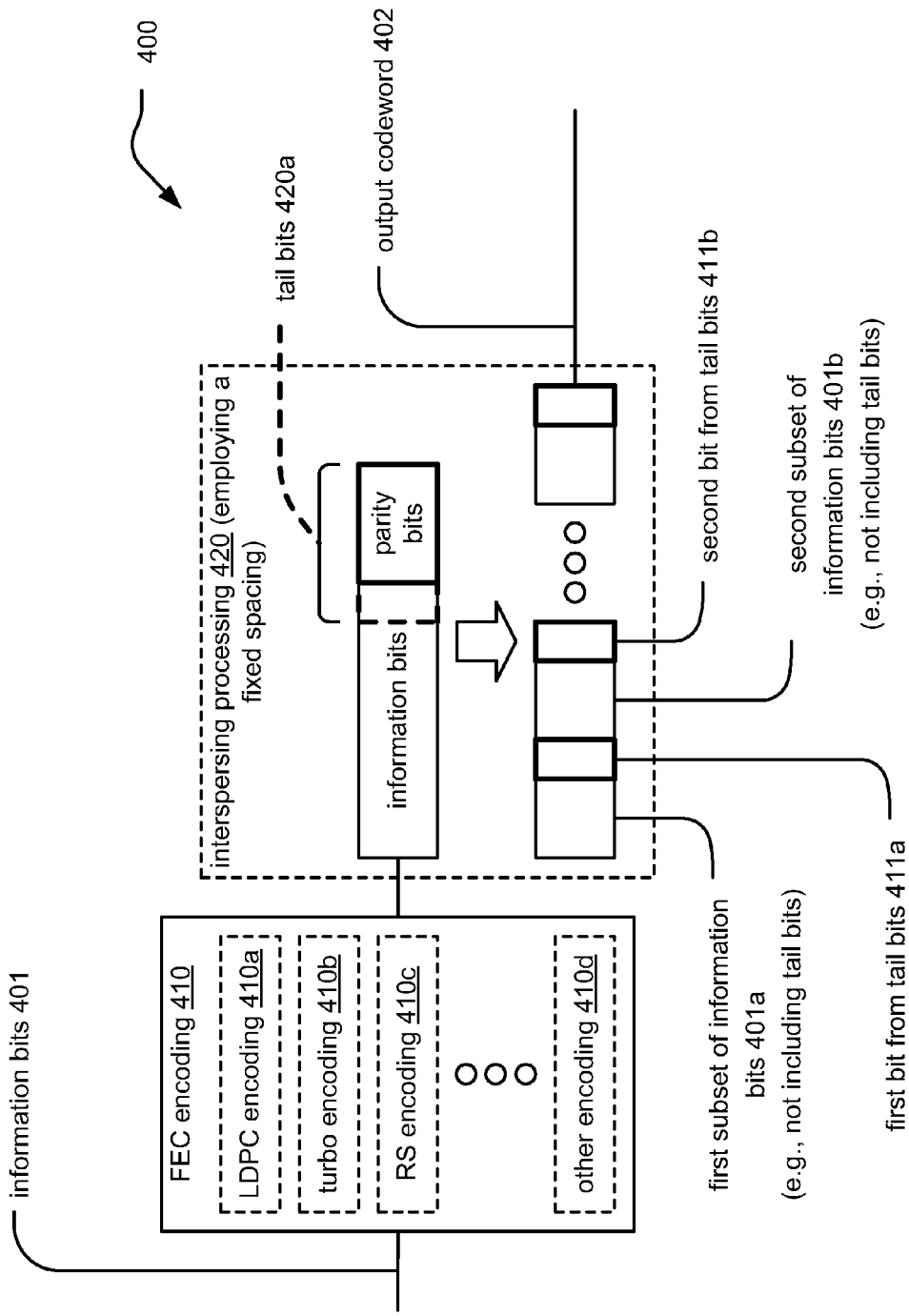
FIG. 4 illustrates an alternative embodiment of at least one portion of a communication device.

FIG. 4 illustrates an alternative embodiment of at least one portion of a communication device. This embodiment is somewhat analogous to the previous embodiment.

Information bits 401 are provided to an FEC (Forward Error Correction) encoding module 410 that is operable to perform encoding thereon to generate a signal that includes the information bits 401 and parity bits. Again, as within other embodiments depicted herein, any of a number of different types of encoding can be performed to generate the parity bits form the information bits, including LDPC encoding 410a, turbo encoding 410b, RS encoding 410c, or any other desired encoding 410d that provides some form of FEC.

Thereafter, an interspersing module 420 operates to employ a fixed spacing to intersperse tail bits among the information bits. At least one difference between this and the previous embodiment is that it is tail bits (composed of the parity bits and at least one information bit) that are interspersed among the information bits. This embodiment shows the information bits grouped into the tail bits as being near an end of the information bit sequence, though it is noted that the one or more information bits selected to be combined with the parity bits to form the tail bits can be selected from anywhere among the info bits in other embodiments.

In this diagram, first bit from the tail bits 411*a* is shown as being placed after a first subset of information bits 401*a*. Also, a second bit from the tail bits 411*b* is placed after a second subset of information bits 401*b*. An output codeword 402 is generated from these information bits with parity bits interspersed there between using a fixed spacing technique.

It is noted again that the order of one or both of the information bits and the tail bits may be changed/altered before their placement into the output codeword 402.

Figure 5:
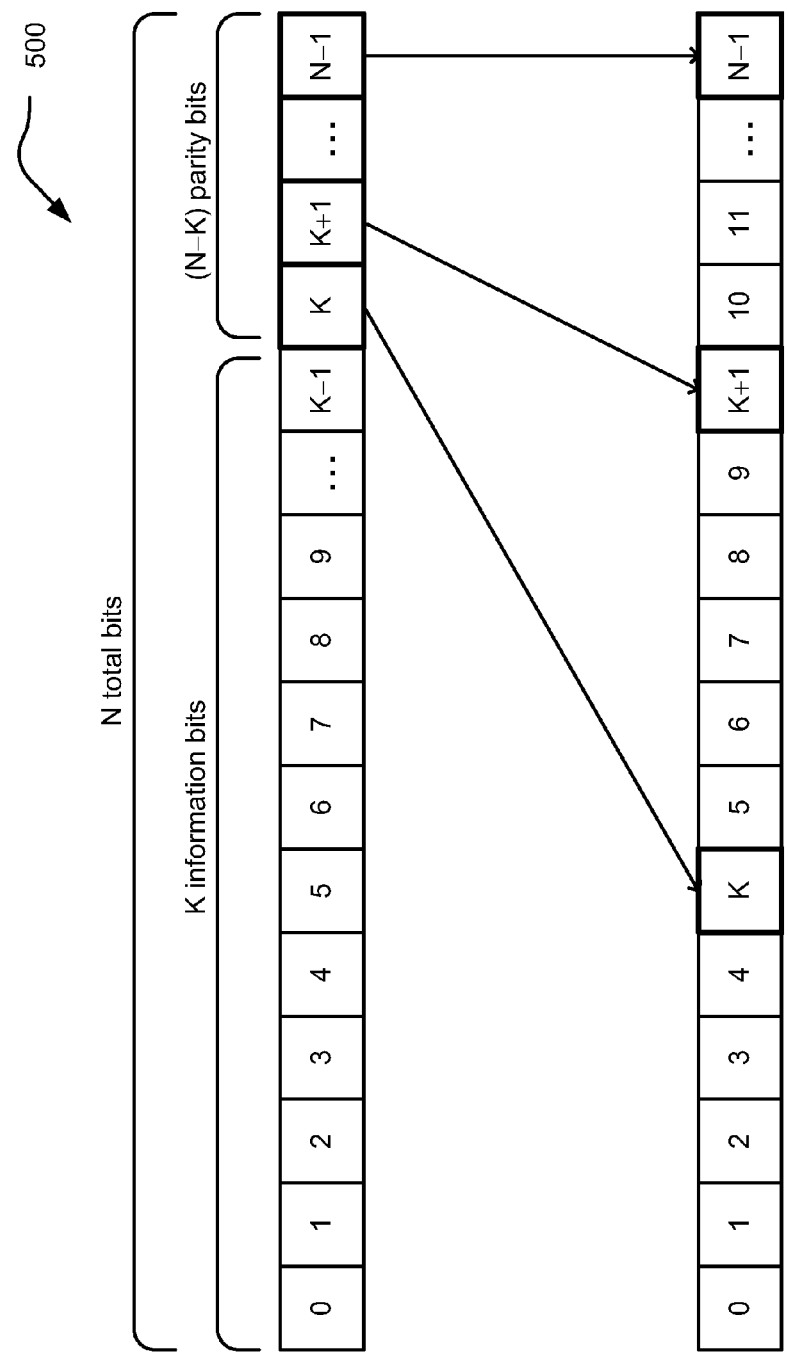
FIG. 5 illustrates an embodiment showing interspersing of parity bits among information bits within a codeword.

FIG. 5 illustrates an embodiment 500 showing interspersing of parity bits among information bits within a codeword. A total of N available bits, composed of K information bits and (N−K) parity bits are available for interspersing processing. A first parity bit (shown as K) is placed after a first subset of the information bits (e.g., shown as 0, 1, 2, 3, 4). Then, a second subset of information bits (e.g., shown as 5, 6, 7, 8, 9) is shown as being placed after the first parity bit (shown as K).

A second parity bit (shown as K+1) is placed after the second subset of the information bits (e.g., shown as 5, 6, 7, 8, 9), and so on.

This interspersing of parity bits among information bits when generating an output codeword can reduce a likelihood of a consecutive run of 1s or 0s within the codeword and/or signal that includes the codeword. As described herein, this can be desirable in a wide variety of applications, including those that include reading/writing of information to/from magnetic storage media.

Figure 6:
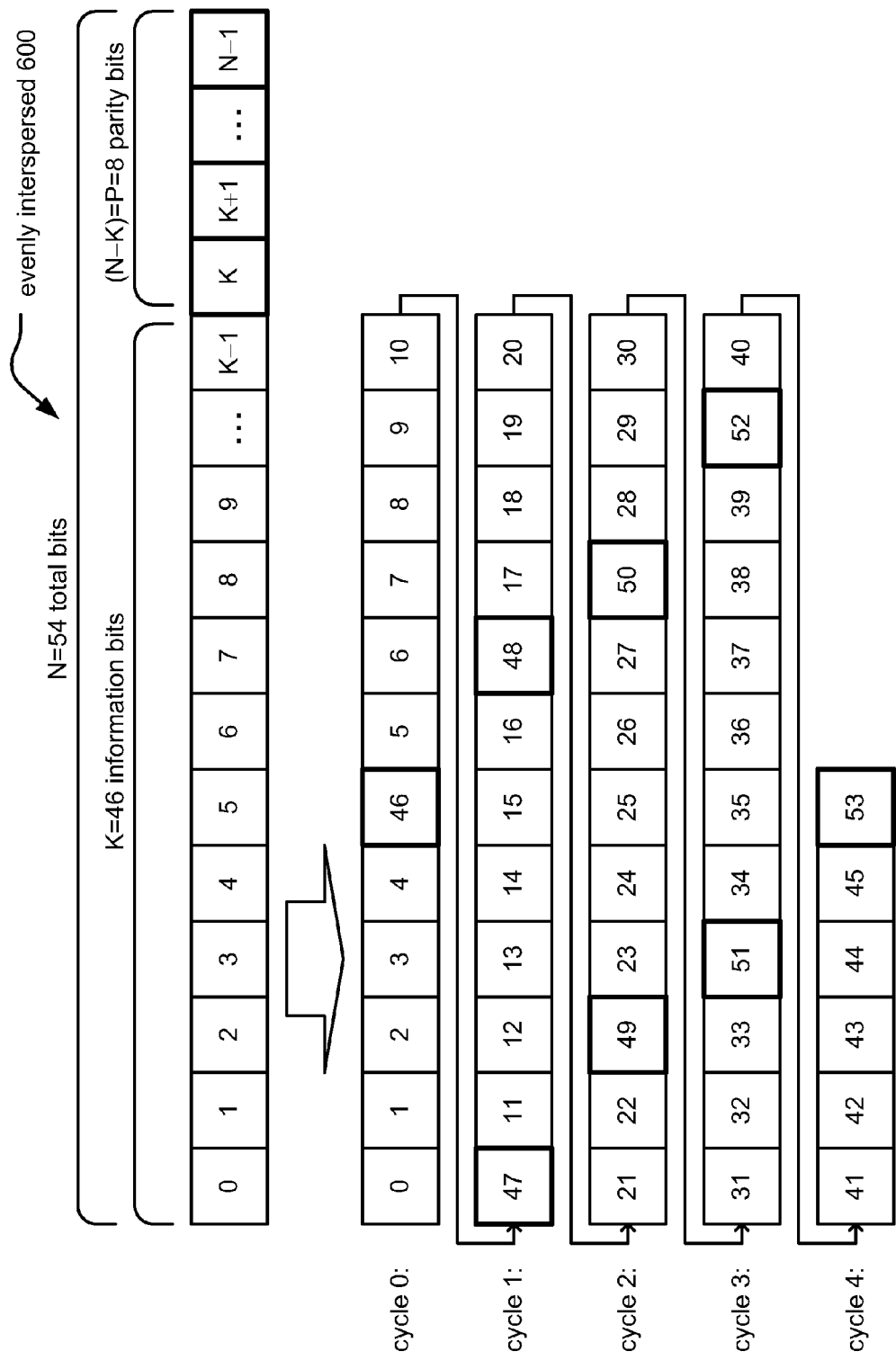
FIG. 6 illustrates a prior art embodiment showing even interspersing of parity bits among information bits within a codeword on a cycle by cycle basis.

FIG. 6 illustrates a prior art embodiment 600 showing even interspersing of parity bits among information bits within a codeword on a cycle by cycle basis. The reader is directed to the "DESCRIPTION OF RELATED ART" section of this document for more detail regarding this diagram.

FIG. 7, FIG. 8, FIG. 9, FIGS. 10, and 11 illustrate embodiments showing fixed spacing based interspersing of parity bits among information bits within a codeword on a cycle by cycle basis.

Figure 7:
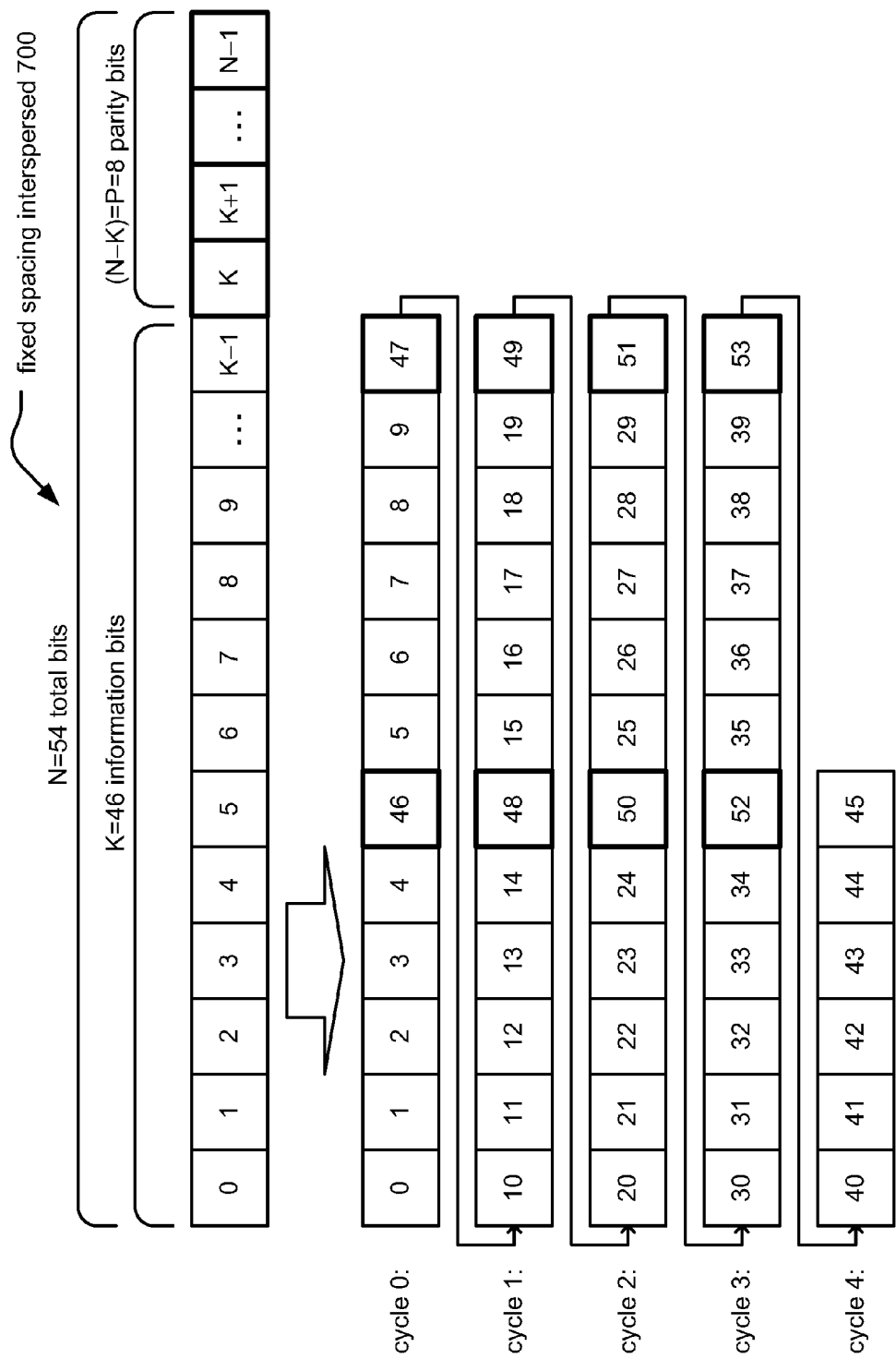
FIG. 7, FIG. 8, FIG. 9, FIGS. 10, and 11 illustrate embodiments showing fixed spacing based interspersing of parity bits among information bits within a codeword on a cycle by cycle basis.

Referring to FIG. 7, in this embodiment 700, the information bits include K=46 bots, and the parity bits include (N−K)=P=8 parity bits of a total number of available bits on N=54.

As can be seen, the parity bits are being distributed among the information bits using a fixed spacing scheme. In this embodiment, the fixed spacing, S, is selected to be 5. If the data comes in at a fixed rate (e.g., 12), then the data at positions 5 and 11 are selected to be parity bits and everything else is an information bit until the parity bits run out.

Using this novel scheme of a fixed spacing as depicted in this embodiment of FIG. 7, then the inputs at positions 5 and 11 must be routed to both storage for the front part (i.e., information bits) and the back part (i.e., parity bits) of the codeword, but the inputs at the other positions only need to go to the storage for the front part of the codeword.

Figure 8:
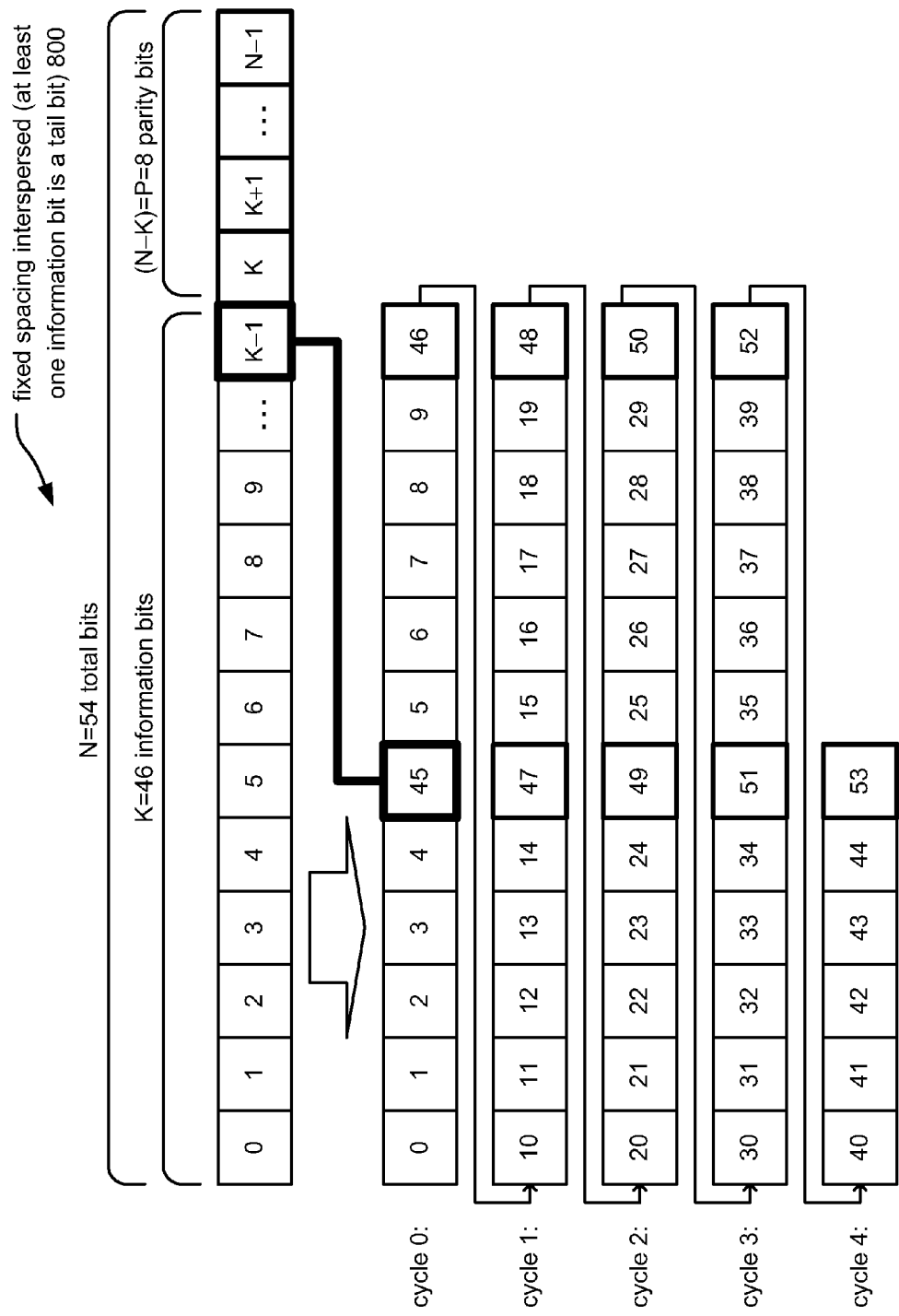

Referring to FIG. 8, this embodiment 800 includes a fixed spacing in which at least one information bit is combined with the parity bits to form tail bits. It is these tail bits that are now interspersed among the remaining information bits.

Given a fixed spacing, S, then define all bits at positions greater that or equal to the following are defined as tail bits:

$$N-\lfloor N/(S+1)\rfloor.$$

Then, one tail bit (e.g., selected from the generated combination of parity bits and at least one information bit) is inserted after every S information bits beginning from the front of the codeword.

Using this novel scheme of a fixed spacing with tail bits as depicted in this embodiment of FIG. 8, the inputs at positions 5 and 11 only need to be routed to storage for the back part (i.e., tail bits) of the codeword, and the inputs at the other positions only need to go to the storage for the front part of the codeword.

Figure 9:
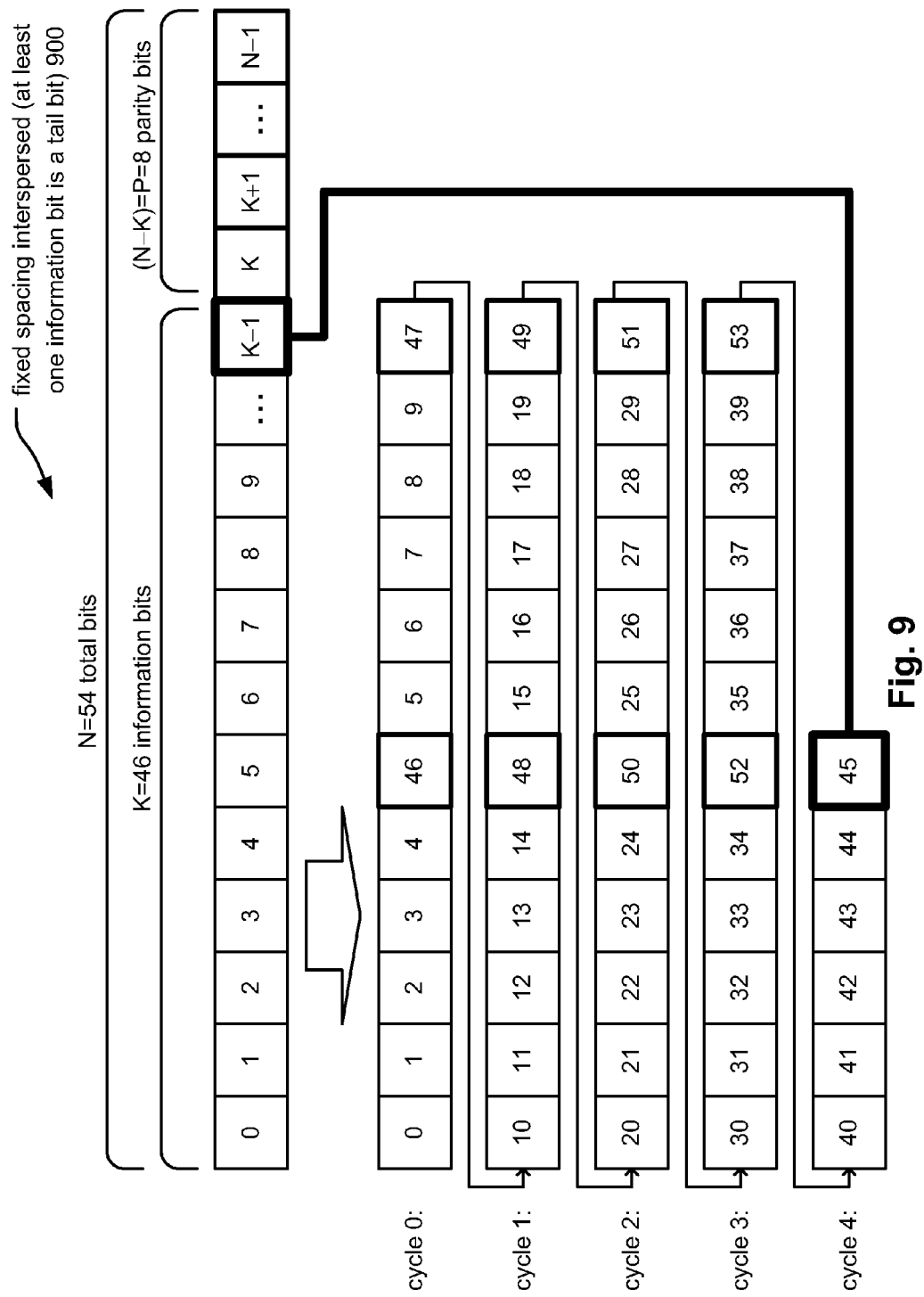

Referring to FIG. 9, this embodiment 900 shows how the order of these tail bits can be placed within the codeword. As an example, if it is supposed that the word boundary is two, and if it the bit depicted by 45 (which happens to be the last information bit among the parity bits in this embodiment) is sent as one of the tail bits and whose location is to be at the end of the codeword, then this requires holding the first tail bit (e.g., bit depicted by 45) until the data depicted by 44 arrives near the end of the codeword. If desired, an alternative embodiment may be to send the leftover tail information bit last so as to obviate any need to store them until the last of the head information bits arrive.

Figure 10:
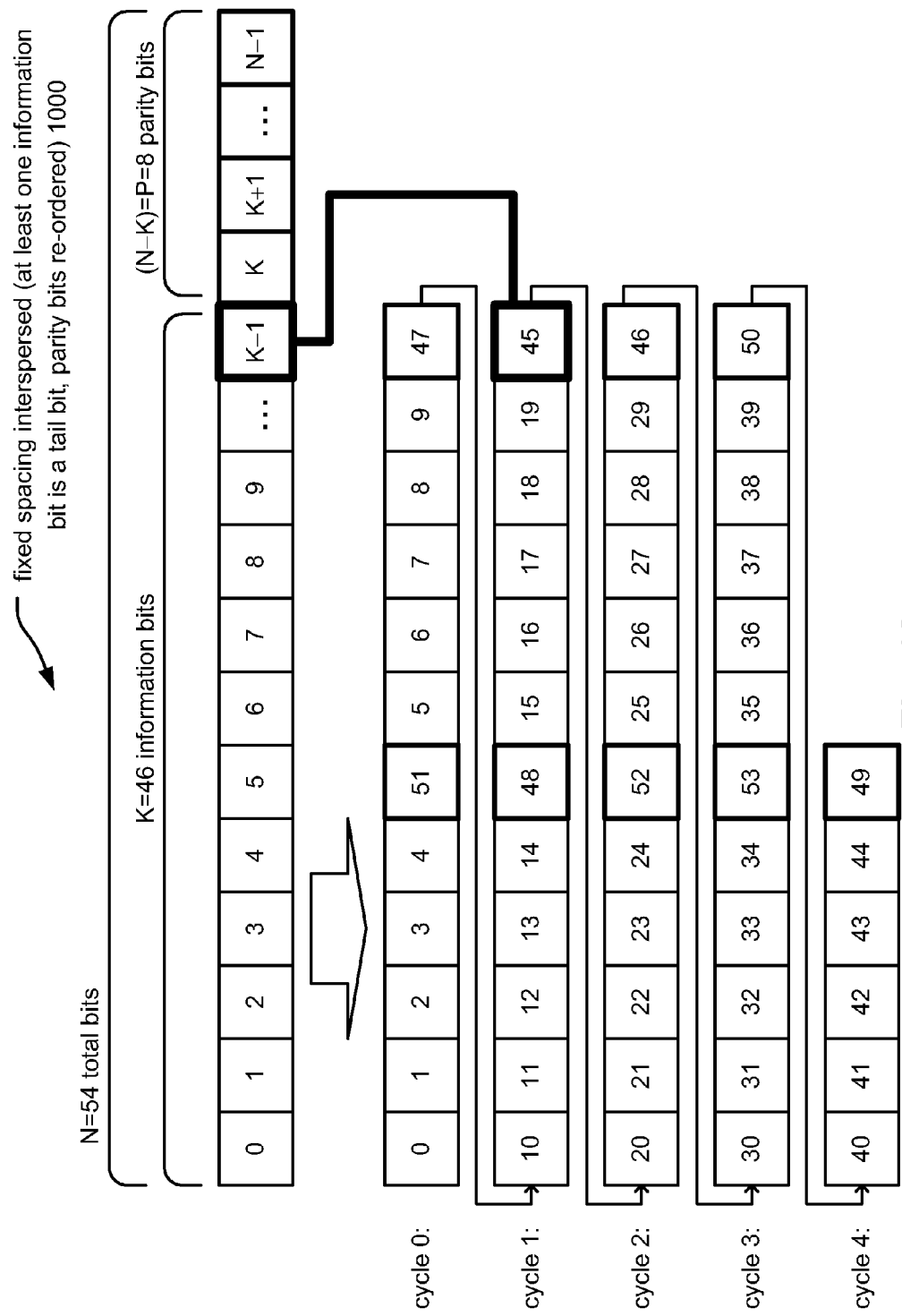

Referring to FIG. 10, this embodiment 1000 shows how the order of the tail bits can be changed before their insertion among the remaining information bits to generate the codeword. This embodiment shows how tail bit depicted by 45 is placed at a different location than in the previous embodiment. In addition, the order of other of the tail bits are also changed before their placement among the remaining information bits (that were not selected to be part of the tail bits).

Figure 11:
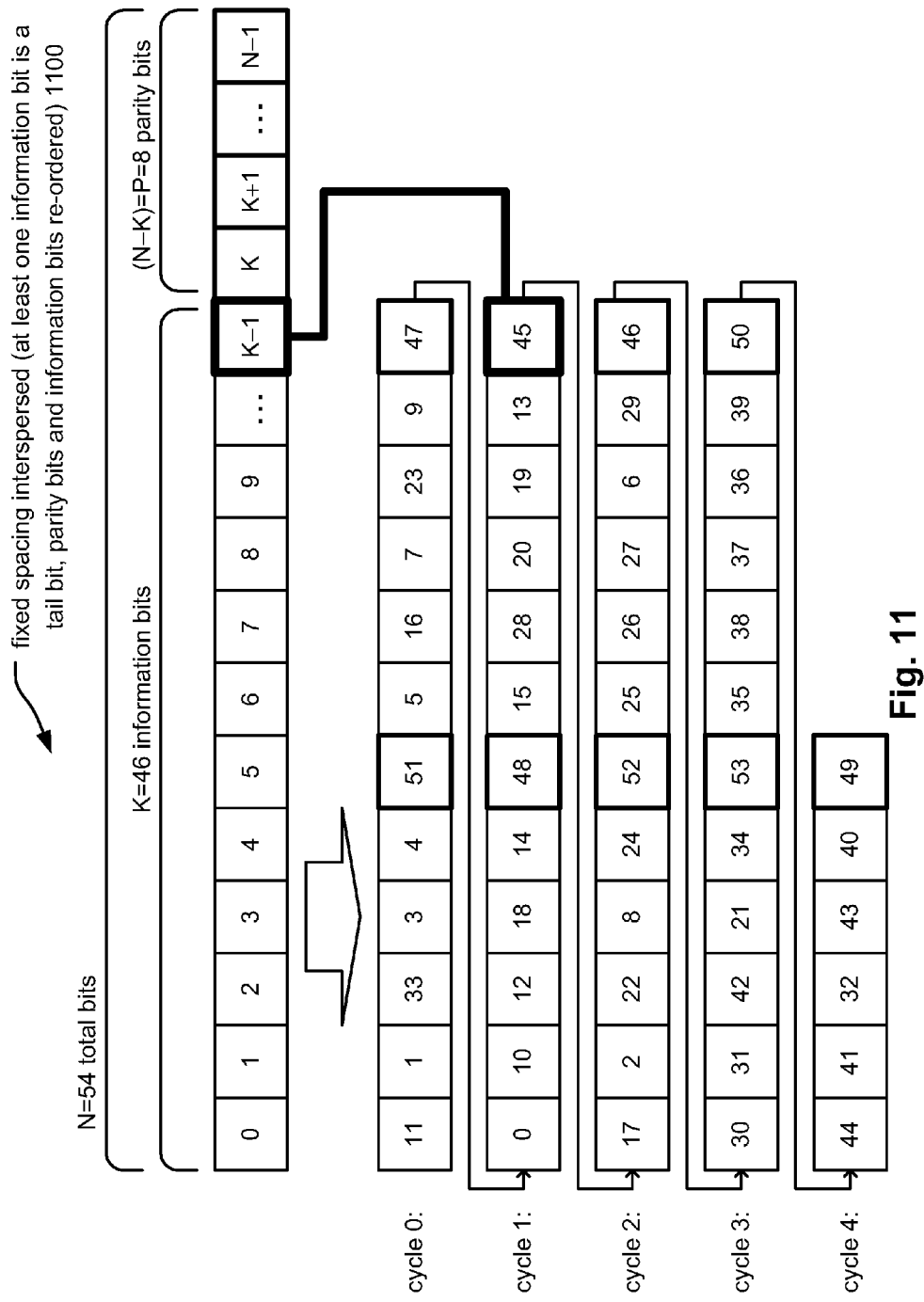

Referring to FIG. 11, this embodiment 1100 shows how the order of the tail bits as well as the order of the remaining information bits not selected to be part of the information bits can be changed before their insertion among the remaining information bits to generate the codeword.

It is also noted that certain embodiments can include changing the order of only one of tail bits or the information bits not selected to be part of the tail bits before placing them within the codeword as well. Any combination thereof (e.g., changing order of only parity bits, of only tail bits, of only information bits, or of only tail bits) can be employed without departing from the scope and spirit of the invention.

Figure 12:
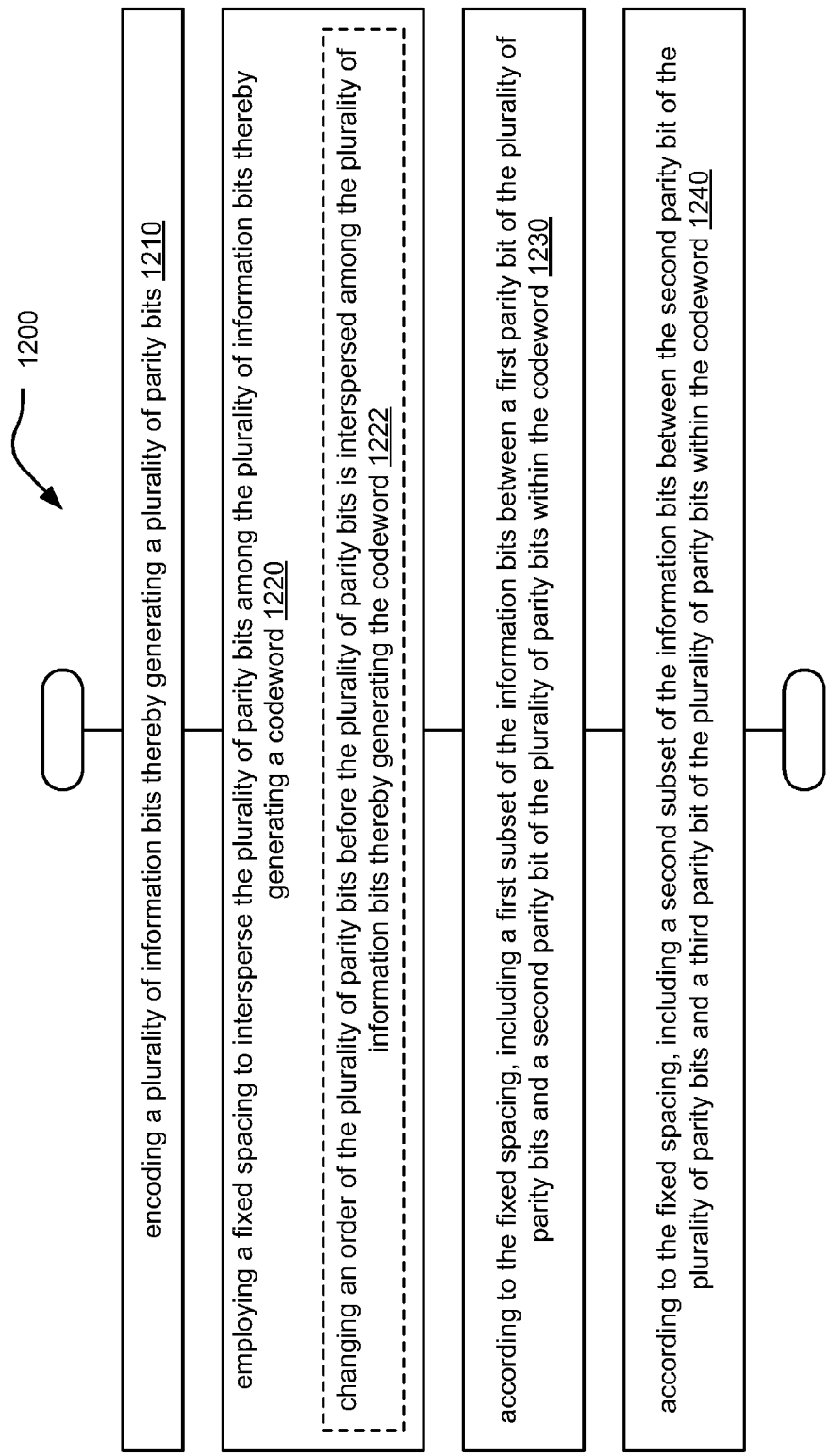
FIG. 12 and FIG. 13 illustrate embodiments of methods for encoding information bits to generate a codeword.
Figure 13:
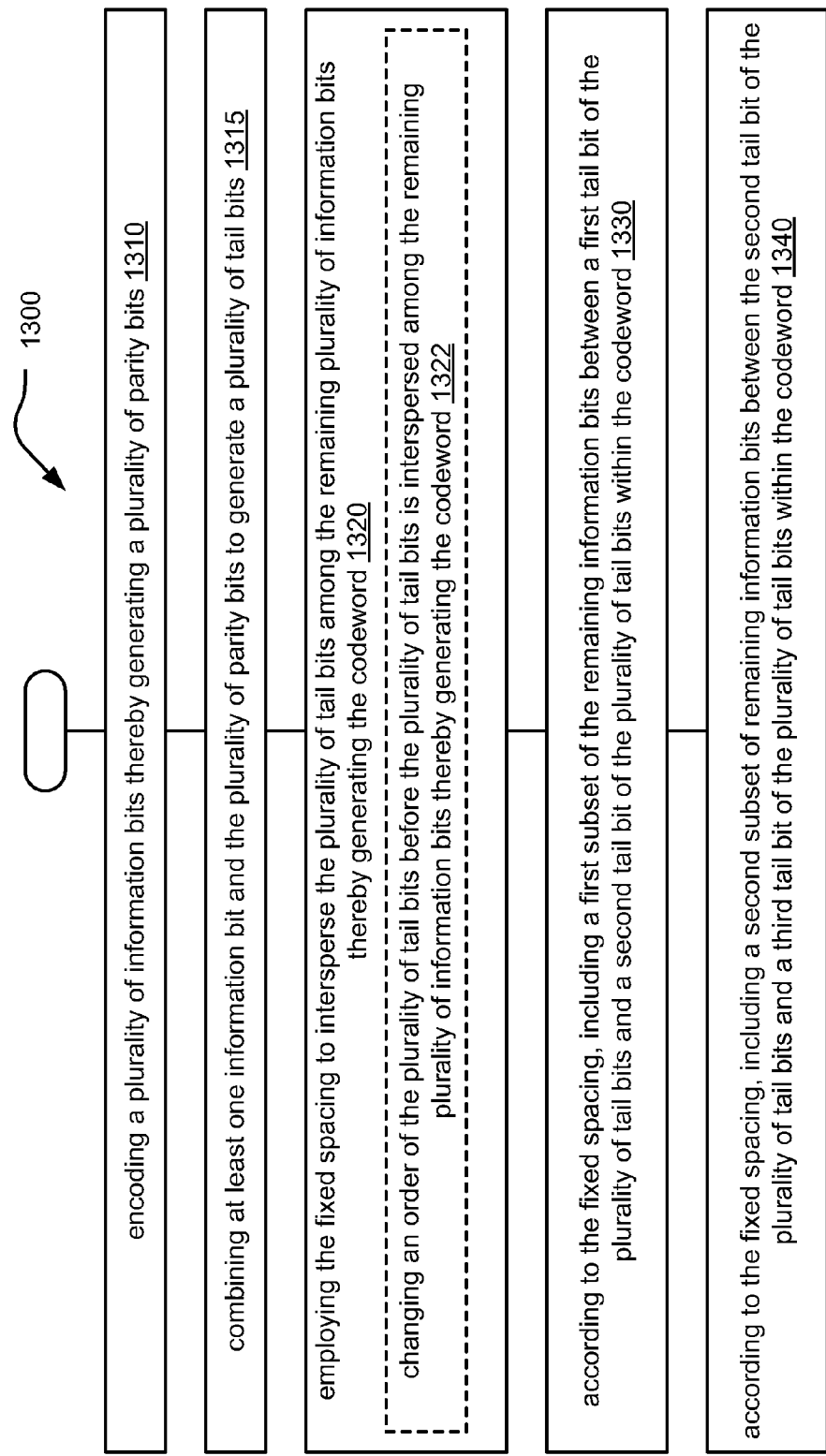

FIG. 12 and FIG. 13 illustrate embodiments of methods for encoding information bits to generate a codeword.

Referring to method 1200 in FIG. 12, the method 1200 begins by encoding a plurality of information bits thereby generating a plurality of parity bits, as shown in a block 1210. The method 1200 continues by employing a fixed spacing to intersperse the plurality of parity bits among the plurality of information bits thereby generating a codeword, as shown in a block 1220. The method 1200 can also involve changing an order of the plurality of parity bits before the plurality of parity bits is interspersed among the plurality of information bits thereby generating the codeword, as shown in a block 1222.

The method 1200 continues by including a first subset of the information bits between a first parity bit of the plurality of parity bits and a second parity bit of the plurality of parity bits within the codeword according to the fixed spacing, as shown in a block 1230.

The method 1200 continues by including a second subset of the information bits between the second parity bit of the plurality of parity bits and a third parity bit of the plurality of parity bits within the codeword. It is noted that each of the first subset of information bits and the second subset of information bits includes a same number of bits according to the fixed spacing, as shown in a block 1240.

Referring to method 1300 in FIG. 13, the method 1300 begins by encoding a plurality of information bits thereby generating a plurality of parity bits, as shown in a block 1310.

The method 1300 continues by combining at least one information bit and the plurality of parity bits to generate a plurality of tail bits, as shown in a block 1315.

The method 1300 continues by employing a fixed spacing to intersperse the plurality of tail bits among the remaining plurality of information bits thereby generating a codeword, as shown in a block 1320. The method 1300 can also involve changing an order of the plurality of tail bits before the plurality of tail bits is interspersed among the remaining plurality of information bits thereby generating the codeword, as shown in a block 1322.

The method 1300 continues by including a first subset of the remaining information bits between a first tail bit of the plurality of tail bits and a second tail bit of the plurality of tail bits within the codeword according to the fixed spacing, as shown in a block 1330.

The method 1300 continues by including a second subset of the remaining information bits between the second tail bit of the plurality of tail bits and a third tail bit of the plurality of tail bits within the codeword. It is noted that each of the first subset of the remaining information bits and the second subset of the remaining information bits includes a same number of bits according to the fixed spacing, as shown in a block 1340.

It is noted that the various modules (e.g., encoders, decoders, encoding modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An encoder, comprising:
an encoding module for encoding a plurality of information bits thereby generating a plurality of parity bits; and wherein:
the encoding module for employing a fixed spacing to intersperse the plurality of parity bits among the plurality of information bits thereby generating a codeword;
according to the fixed spacing, a first subset of information bits of the plurality of bits being between a first parity bit of the plurality of parity bits and a second parity bit of the plurality of parity bits;
according to the fixed spacing, a second subset of information bits of the plurality of bits being between the second parity bit of the plurality of parity bits and a third parity bit of the plurality of parity bits;
each of the first subset of information bits and the second subset of information bits including a same number of bits;
the encoding module for combining at least one information bit and the plurality of parity bits to generate a plurality of tail bits; and
the encoding module for employing the fixed spacing to intersperse the tail bits among the plurality of information bits thereby generating the codeword.

2. The encoder of claim 1, wherein:
an order of the plurality of information bits being changed before the plurality of parity bits being interspersed among the plurality of information bits thereby generating the codeword.

3. The encoder of claim 1, wherein:
the encoding module for combining a selected subset of information bits of the plurality of information bits and the plurality of parity bits to generate a plurality of tail bits; and
the encoding module for employing the fixed spacing to intersperse the tail bits among the plurality of information bits thereby generating the codeword.

4. The encoder of claim 1, wherein:
the encoding module for combining a selected subset of information bits of the plurality of information bits and the plurality of parity bits to generate a plurality of tail bits; and
the encoding module for employing the fixed spacing to intersperse the tail bits among the plurality of information bits thereby generating the codeword.

5. The encoder of claim 1, wherein:
an order of the plurality of parity bits being changed before the plurality of parity bits being interspersed among the plurality of information bits thereby generating the codeword.

6. The encoder of claim 1, wherein:
the fixed spacing being S;
the codeword including N bits;
all bits within the codeword at position greater than or equal to $N-\lfloor N/(S+1) \rfloor$ forming a plurality of tail bits;
one tail bit from the plurality of tail bits inserted, respectively, after every S information bits from a beginning of the codeword; and
each of S and N being a respective integer.

7. The encoder of claim 1, wherein:
the fixed spacing is selected based on a first number of bits within the plurality of information bits and a second number of bits within the plurality of parity bits.

8. The encoder of claim 1, wherein:
the encoding module for performing LDPC (Low Density Parity Check) encoding.

9. The encoder of claim 1, wherein:
the encoder implemented within a communication device operative within at least one of a satellite communication system, a wireless communication system, a wired communication system, and a fiber-optic communication system.

10. The encoder of claim 1, wherein:
the encoder implemented within a hard disk drive (HDD); and
the codeword written to storage media of the HDD.

11. An encoder, comprising:
an encoding module for encoding a plurality of information bits thereby generating a plurality of parity bits; and wherein:
the encoding module for combining at least one information bit and the plurality of parity bits to generate a plurality of tail bits; and
the encoding module for employing a fixed spacing to intersperse the tail bits among the plurality of information bits thereby generating a codeword;
according to the fixed spacing, a first subset of information bits of the plurality of bits being between a first parity bit of the plurality of parity bits and a second parity bit of the plurality of parity bits;
according to the fixed spacing, a second subset of information bits of the plurality of bits being between the second parity bit of the plurality of parity bits and a third parity bit of the plurality of parity bits;
each of the first subset of information bits and the second subset of information bits including a same number of bits; and
an order of the plurality of parity bits being changed before the plurality of parity bits being interspersed among the plurality of information bits thereby generating the codeword.

12. The encoder of claim 11, wherein:
the fixed spacing being S;
the codeword including N bits;
all bits within the codeword at position greater than or equal to $N-\lfloor N/(S+1) \rfloor$ forming a plurality of tail bits;
one tail bit from the plurality of tail bits inserted, respectively, after every S information bits from a beginning of the codeword; and
each of S and N being a respective an integer.

13. The encoder of claim 11, wherein:
the encoding module for performing LDPC (Low Density Parity Check) encoding.

14. The encoder of claim 11, wherein:
the encoder implemented within a communication device operative within at least one of a satellite communication system, a wireless communication system, a wired communication system, and a fiber-optic communication system.

15. The encoder of claim 11, wherein:
the encoder implemented within a hard disk drive (HDD); and
the codeword written to storage media of the HDD.

16. A method for encoding information bits to generate a codeword, the method comprising:
encoding a plurality of information bits thereby generating a plurality of parity bits;
employing a fixed spacing to intersperse the plurality of parity bits among the plurality of information bits thereby generating a codeword;
according to the fixed spacing, including a first subset of information bits of the plurality of bits between a first parity bit of the plurality of parity bits and a second parity bit of the plurality of parity bits within the codeword;
according to the fixed spacing, including a second subset of information bits of the plurality of bits between the second parity bit of the plurality of parity bits and a third parity bit of the plurality of parity bits within the codeword, wherein each of the first subset of information bits and the second subset of information bits including a same number of bits; and
changing an order of the plurality of parity bits before the plurality of parity bits is interspersed among the plurality of information bits thereby generating the codeword.

17. The method of claim 16, further comprising:
combining at least one information bit and the plurality of parity bits to generate a plurality of tail bits; and
employing the fixed spacing to intersperse the tail bits among the plurality of information bits thereby generating the codeword.

18. The method of claim 16, further comprising:
changing an order of the plurality of information bits before the plurality of parity bits is interspersed among the plurality of information bits thereby generating the codeword.

19. The method of claim 16, wherein:
the method performed within an encoder;
the encoder implemented within a communication device operative within at least one of a satellite communication system, a wireless communication system, a wired communication system, and a fiber-optic communication system.

20. The method of claim 16, wherein:
the method performed within an encoder;
the encoder implemented within a hard disk drive (HDD); and
the codeword written to storage media of the HDD.

* * * * *

UNITED STATES PATENT AND TRADEMARK OFFICE
CERTIFICATE OF CORRECTION

PATENT NO. : 8,086,930 B2
APPLICATION NO. : 12/021911
DATED : December 27, 2011
INVENTOR(S) : Tak K. Lee It is certified that error appears in the above-identified patent and that said Letters Patent is hereby corrected as shown below:

Col. 9, line 25, in claim 7: delete "is"
Col. 10, line 9, in claim 12: after "respective" delete "an"

Signed and Sealed this
Fifth Day of March, 2013

Teresa Stanek Rea
*Acting Director of the United States Patent and Trademark Office*